United States Patent
Papierniak et al.

(10) Patent No.: US 6,317,794 B1
(45) Date of Patent: Nov. 13, 2001

(54) COMPUTER SYSTEM AND COMPUTER IMPLEMENTED METHOD FOR SYNCHRONIZATION OF SIMULTANEOUS WEB VIEWS

(75) Inventors: Karen A. Papierniak, St. Paul, MN (US); James E. Thaisz, Lincroft; Luo-Jen Chiang, Freehold, both of NJ (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/968,730

(22) Filed: Nov. 12, 1997

(51) Int. Cl.[7] .............................. G06F 15/16; G06F 9/00
(52) U.S. Cl. ........................................ 709/229; 709/105
(58) Field of Search ................................... 709/213, 214, 709/216, 217, 218, 229, 105; 707/10, 2, 3, 5, 501, 513; 711/147; 345/329, 330, 512

(56) References Cited

U.S. PATENT DOCUMENTS

| | | | | |
|---|---|---|---|---|
| 4,602,279 | * | 7/1986 | Freeman | 348/10 |
| 5,319,777 | * | 6/1994 | Perez | 707/10 |
| 5,455,945 | * | 10/1995 | VanderDrift | 707/2 |
| 5,553,864 | * | 9/1996 | Sitrick | 463/31 |
| 5,583,761 | * | 12/1996 | Chou | 707/536 |
| 5,604,604 | * | 2/1997 | Fan | 386/125 |
| 5,664,128 | * | 9/1997 | Bauer | 345/334 |
| 5,706,495 | * | 1/1998 | Chadha et al. | 707/2 |
| 5,740,430 | * | 4/1998 | Rosenberg et al. | 707/200 |
| 5,797,136 | * | 8/1998 | Boyer et al. | 707/2 |
| 5,818,446 | * | 10/1998 | Bertram et al. | 345/334 |
| 5,838,906 | * | 11/1998 | Doyle et al. | 709/202 |
| 5,861,883 | * | 1/1999 | Cuomo et al. | 345/326 |
| 5,864,871 | * | 1/1999 | Kitain et al. | 707/104 |
| 5,889,942 | * | 3/1999 | Orenshteyn | 713/201 |
| 5,899,810 | * | 5/1999 | Smith | 463/42 |
| 5,940,818 | * | 8/1999 | Malloy et al. | 707/2 |
| 5,943,668 | * | 8/1999 | Malloy et al. | 707/3 |
| 5,978,788 | * | 11/1999 | Castelli et al. | 707/2 |
| 6,076,091 | * | 6/2000 | Fohn et al. | 707/102 |

\* cited by examiner

*Primary Examiner*—Mark H. Rinehart
*Assistant Examiner*—Jason Cardone
(74) *Attorney, Agent, or Firm*—Lowe, Hauptman, Gilman & Berner, LLP

(57) ABSTRACT

A computer system provides synchronizating of multiple simultaneous information presences with different views. The computer system includes at least one storage storing the different views, and at least one user computer transmitting a user request for receiving at least one of the different views. The computer system also includes at least one server, connectable to the storage and the user computer. The computer system initializes the different views on at least one information source, establishes at least one relationship between the different views, assigns a user type and at least one of the different views to each user, and transmits to each user the at least one of the different views responsive to the user request, the user type, the at least one of the different views, and the relationship. A method and computer memory product are also provided.

23 Claims, 7 Drawing Sheets

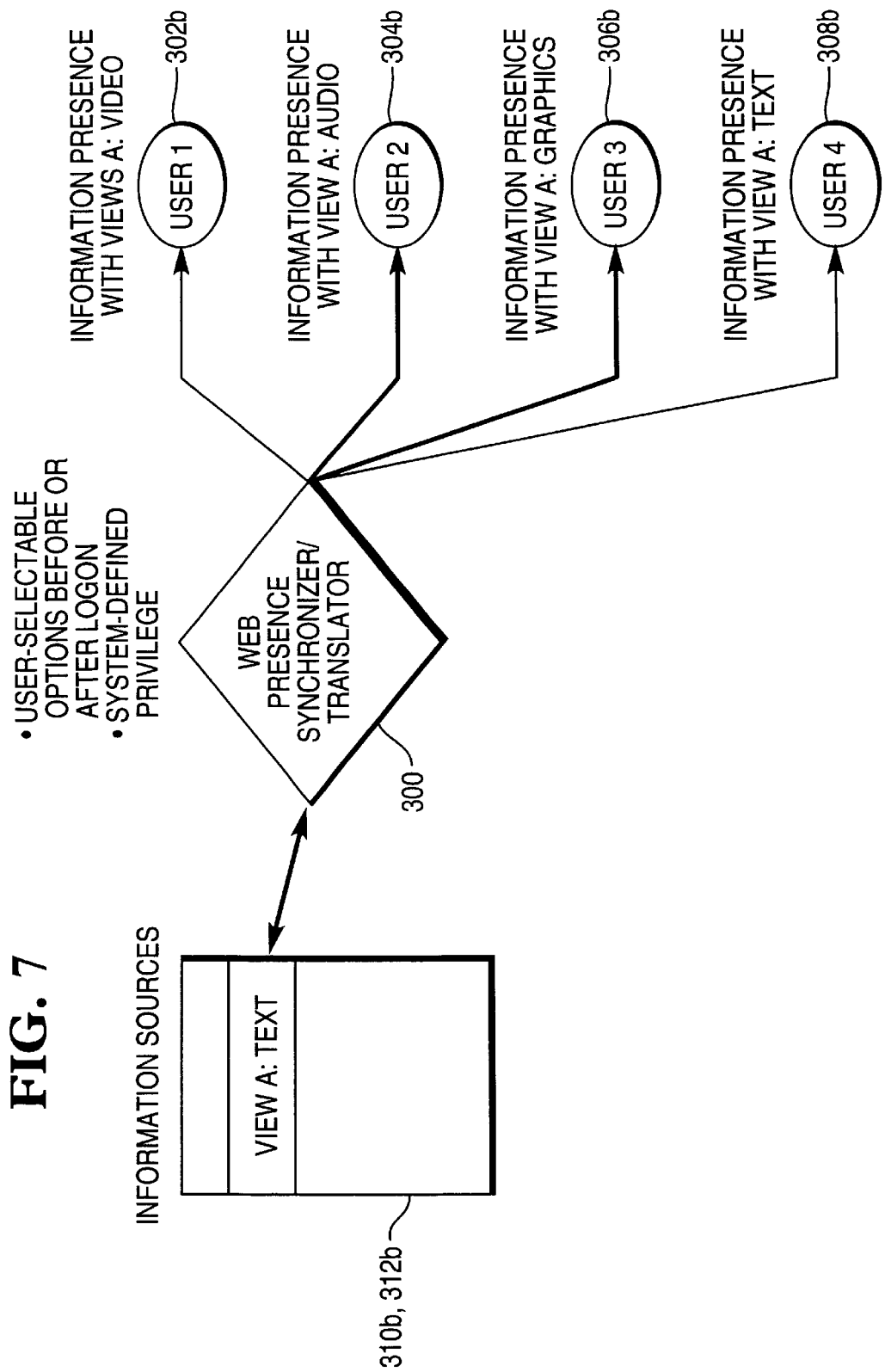

COMPUTER SYSTEM AND COMPUTER IMPLEMENTED METHOD FOR SYNCHRONIZATION OF SIMULTANEOUS WEB VIEWS

BACKGROUND OF THE INVENTION

1. Field of the Invention

The present invention is generally related to computer systems and methods of presenting information to multiple users who may need to look at the same, similar and/or different information, and more specifically, to computer systems and computer implemented methods of synchronization of multiple web information presences to present information to multiple users who may need to look at the same, similar and/or different information.

2. Background of the Related Art

There is a vast amount of information in the world today that is available by computer. For example, on the World Wide Web alone there are millions of browsers and millions of web pages. In addition to the Internet, companies have set up local "intranets" for storing and accessing data for running their organizations. However, the sheer amount of available information is posing increasingly more difficult challenges to conventional approaches.

A major difficulty to overcome is that information relevant to a purpose of a user is often dispersed across the network at many sites. It is often time-consuming for a user to visit all these sites. One conventional approach is a search engine. A search engine is actually a set of programs accessible at a network site within a network, for example a local area network (LAN) at a company or the Internet and World Wide Web. One program, called a "robot" or "spider," pre-traverses a network in search of documents and builds large index files of keywords found in the documents.

A user of the search engine formulates a query comprising one or more keywords and submits the query to another program of the search engine. In response, the search engine inspects its own index files and displays a list of documents that match the search query, typically as hyperlinks. When a user activates one of the hyperlinks to see the information contained in the document, the user exits the site of the search engine and terminates the search process.

Search engines, however, have their drawbacks. For example, a search engine is oriented to discovering textual information only. In particular, they are not well-suited to indexing information contained in structured databases, e.g. relational databases, voice related information, audio related information, and the like. Moreover, mixing data from incompatible data sources is difficult in conventional search engines.

Another disadvantage with conventional search engines is that irrelevant information is aggregated with relevant information. For example, it is not uncommon for a search engine on the World Wide Web to locate hundreds of thousands of documents in response to a single query. Many of those documents are found because they coincidentally include the same keyword in the search query. Sifting through search results in the thousands, however, is a daunting task.

As another example, a personnel administrator might be interested in an employee's choice of health plan, but an MIS administrator would be more interested in which computer the employee is using. Therefore, the user has to sort out which documents and databases are relevant and which are irrelevant for a particular goal.

Unfortunately, conventional techniques are unable to present information based on, or catered for, the specific user receiving same. In addition, conventional techniques are unable to present different forms of information to the user as retrieved from one or more information sources. For example, existing content customization addresses only individual interest and needs. Further, existing call center technology addresses the same set of information, for example, between the customer and the customer support agent.

We have discovered that different users are unable to examine multiple versions of information depending on the business objectives and required functionality. We have further discovered that multiple versions of information are not based on either user-selectable options or systems-defined privileges.

Accordingly, there exists a need in the art for different users to examine multiple versions of information depending on the business objectives and required functionality, and/or personal preferences. There also exists a need in the art for multiple versions of information to be accessible to different users based on either user-selectable options or systems-defined privileges.

SUMMARY OF THE INVENTION

To overcome the above-detailed disadvantages and shortcomings of the prior art, it is a feature and advantage of the present invention to provide different users the option of examining multiple versions of information depending on the business objectives and required functionality, and/or personal preferences.

It is another feature and advantage of the present invention to provide the ability of multiple users to access multiple versions of information based on either user-selectable options or systems-defined privileges.

It is another feature and advantage of the present invention to synchronize multiple web pages among customers, customer agents and his/her manager, and billing agents.

The present invention. manages relationships among electronic merchants, their customers/buyers and partners (e.g., clearing house, bank institutions) to allow different types of information be presented to different people based on their business functions (e.g., sales, customer support, billing), need to know requirements (e.g., executive, mid-level manager, internal, external), and business operation status (e.g., subscriber, visitor), and personal preferences (e.g., spread sheet, graph).

Some of the additional features of the present invention are:

1. The invention addresses the multiple interests and needs within a group or a community of interest on the Web.
2. The invention deals with multiple versions of the information displayed to the user or customer and the customer support agent.
3. The invention captures and collects for both synchronization of simultaneous web views and translation of information into multiple media variations, the history of operation of the Web Sychronizer/Translator.
4. For both synchronization of simultaneous web views and translation of information into multiple media variations, the actual operation for either the assembly of views or the translation/conversion among multiple media variations can occur either on-line or off-line, at either the information source(s) or web synchronizer/translator.

In the attainment of the same, the present invention provides a method of implementing, generating, and/or displaying, on a display device of a computer system a synchronization method for multiple simultaneous information presences. The present invention also includes a computer system employing the method, a computer readable memory storing the medium, and a method for storing the synchronization process in a memory.

In accordance with one embodiment of the invention, a computer system provides synchronization of multiple simultaneous information presences with different views. The computer system includes at least one storage storing the different views, and at least one user computer transmitting a user request for receiving at least one of the different views. The computer system also includes at least one server, connectable to the storage and the user's computer. The computer system initializes the different views on at least one information source, establishes at least one relationship between the different views, assigns a user type and at least one of the different views to each user, and transmits to each user the at least one of the different views responsive to the user request and/or privilege, the user type, the at least one of the different views, and the relationship.

A method and computer memory product are also provided. The computer memory stores, and a computer executes, a program including the above process steps.

In addition, a computer system, method and computer memory are provided for the display of multiple media variations and/or multiple views having substantially the same view and/or different views to different users.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The above objects of the invention, together with other apparent objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

For a more complete understanding of the present invention and the advantages thereof, reference is now made to the following descriptions taken in conjunction with the accompanying drawings in which like numbers designate like parts, and in which:

FIG. 7 depicts a distributed on-line, and interactive environment in accordance with the second embodiment of the invention.

NOTATIONS AND NOMENCLATURE

Figure 1:
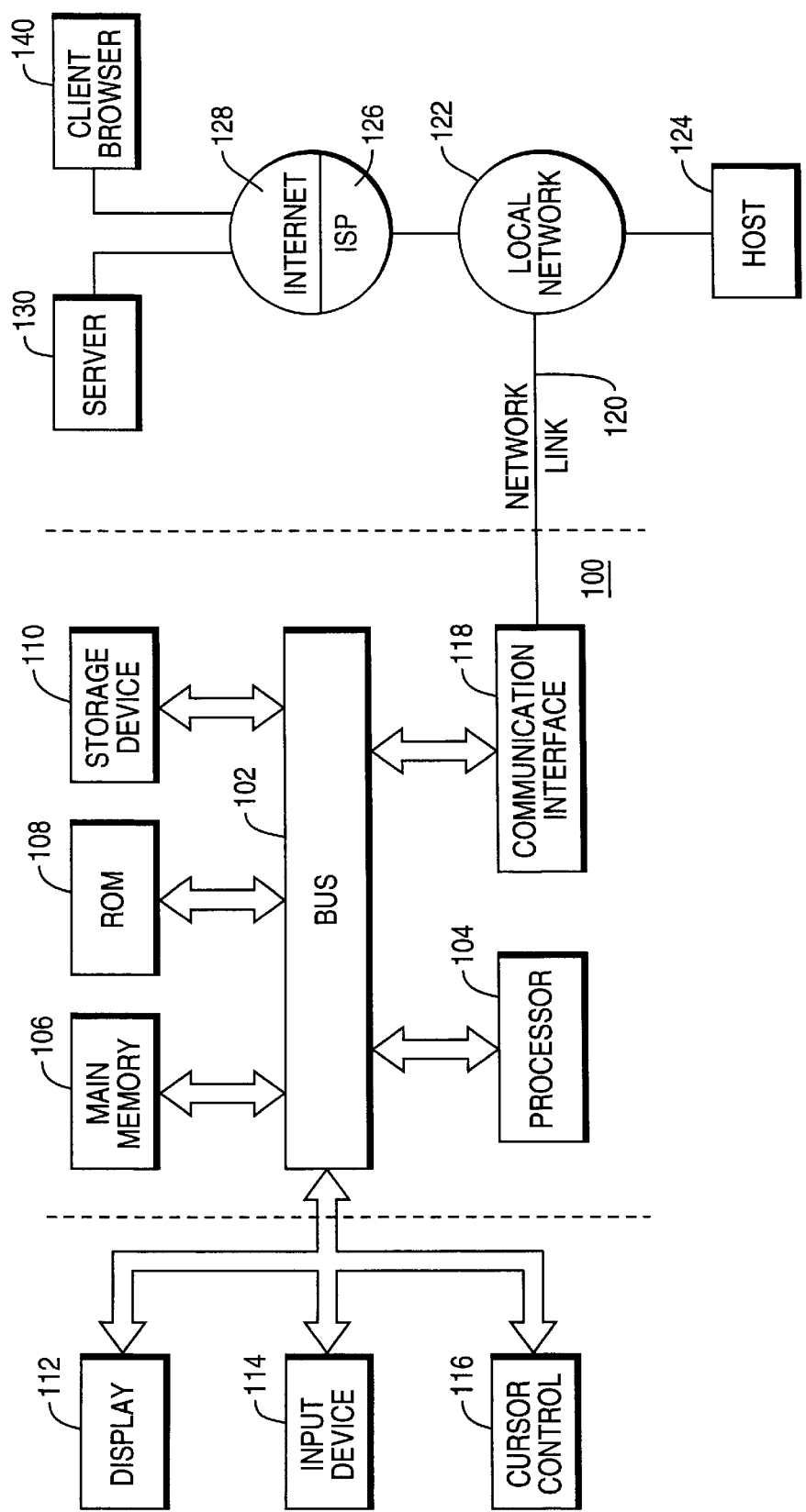
FIG. 1 is a high-level block diagram of a computer system and/or networked computer system with which the present invention can be implemented.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

BEST MODE FOR CARRYING OUT THE INVENTION

In a distributed, on-line and interactive environment, there are multiple users who may need to look at the same, similar, and different information. These users may access the information of the same or different sources. No matter where the information is coming from, the multiple users should be able to examine multiple versions of information depending on the business objectives, required functionality, and personal preference. These multiple versions of information should also be based on either user-selectable options or systems-defined privileges.

The definition of an information source includes a source component of a web page, source components of a web page, a web page, web pages, a web server, or multiple servers. An information source can contain many components. The media formats of the components of these information sources include text, audio, video, image, graphic, database, and associated database objects. A view associated with an information source and/or information sources is defined as a collection of the components of an information source and/or information sources. An information presence is defined as, for example, a presentation of a view and/or views to the user.

The present invention defines or describes what and how the Web information presences are coordinated, customized, and presented in the same, similar, and different manners. In addition, the presentation of a view should allow multiple media variations of the presence for the same view and/or different views.

The present invention manages relationships among electronic merchants, their customers/buyers and partners (e.g., clearing house, bank institutions) to allow different types of information be presented to different people based on their business functions (e.g., sales, customer support, billing), need to know requirements (e.g., executive, mid-level manager, internal, external), presentation preferences (e.g., audio, video, graphics text) and business operation status (e.g., subscriber, visitor).

Features of the present invention include:
1. addressing multiple interests and needs within a group or a community of interest on the Web.
2. managing multiple versions of the information between the user or customer and the customer support agent.

A method and apparatus for the synchronization of simultaneous information presences and/or multiple media variations is described herein. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

FIG. 1 is a high-level block diagram of a computer system with which the present invention can be implemented. FIG. 1 is a block diagram which illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), which allows the device to specify positions in a plane.

The invention is related to the use of computer system 100 in conjunction with or as an information presence synchronizer/translator to display multiple media variation presences to different users and/or multiple media variations. According to one embodiment of the invention, computer system 100 performs the synchronization/translation in response to processor 104 executing sequences of instructions contained in main memory 106. Such instructions may be read into main memory 106 from another computer-readable medium, such as storage device 110.

However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read.

Execution of the sequences of instructions contained in main memory 106 causes processor 104 to perform the process steps previously described. In alternative embodiments, hard-wired circuitry may be used in place of or in combination with software instructions to implement the invention. Thus, embodiments of the invention are not limited to any specific combination of hardware circuitry and software.

Computer system 100 also includes a communication interface 118 coupled to bus 102. Communication interface 108 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a client browser 140 might transmit a requested code for an application program through Internet 128, ISP 126, local network 122 and communication interface 118. In accordance with the invention, one such downloaded application provides for the synchronization method as described herein.

The received code may be executed by processor 104 as it is received, and/or stored in storage device 110, or other non-volatile storage for later execution. In this manner, computer system 100 may obtain application code in the form of a carrier wave.

Figure 2:
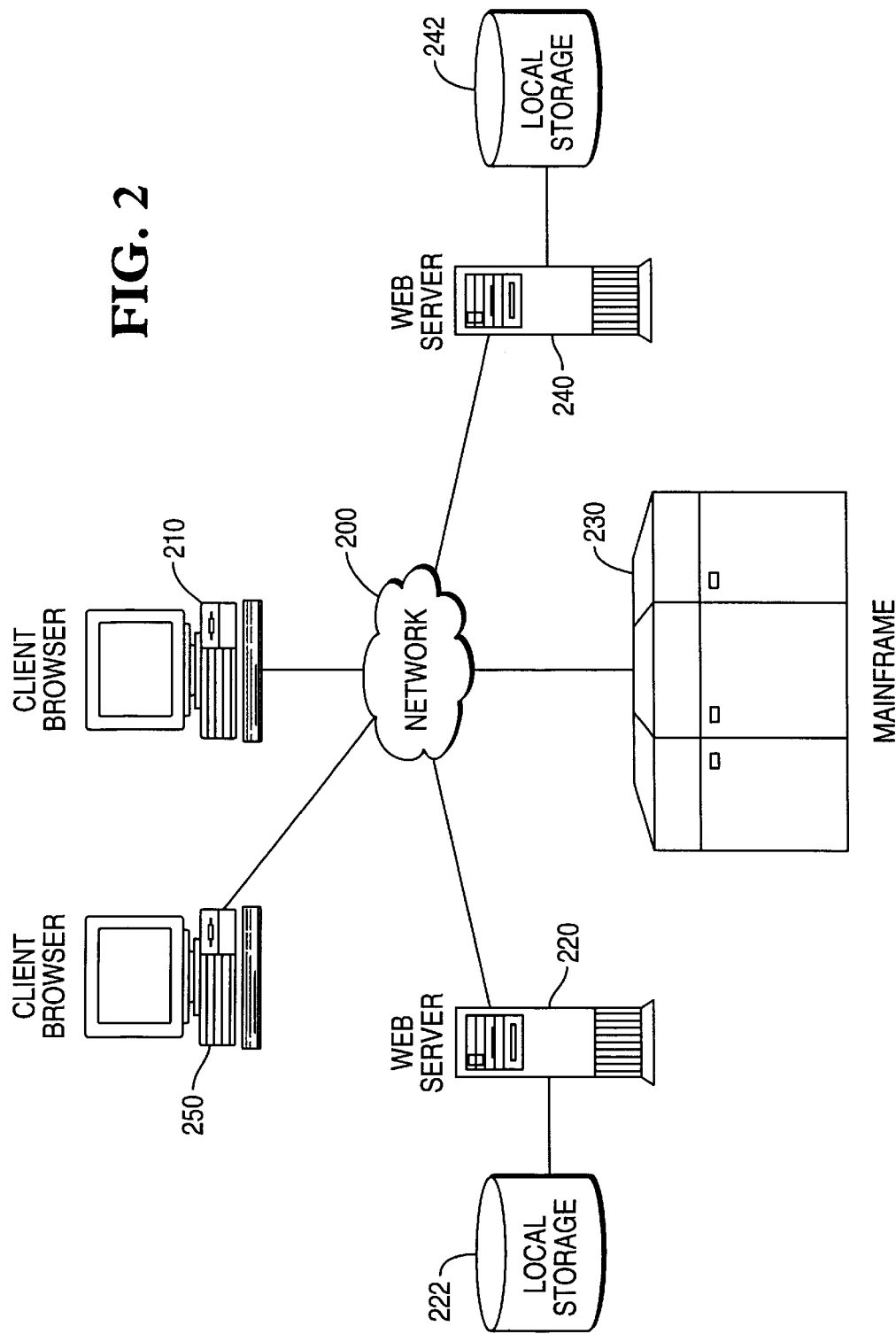
FIG. 2 is a diagram of a network in which the present invention can be implemented.

FIG. 2 is a diagram of a network in which the present invention can be implemented. Referring to FIG. 2, depicted is a network 200 within which the present invention may be implemented. A web server 220 according to one embodiment of the present invention gathers information dynamically from one or more data sources, which may be located at different servers and may have incompatible formats, and outputs the information for the user according to predetermined criteria discussed below.

The predetermined criteria may be defined by human operators according to their own needs, purposes, and preferences as part of the configuration of the server. Alternatively, the predetermined criteria may be determined based on system-defined user privileges or user preferences. For example, users with a higher clearance, security and/or seniority level may be able to obtain more information than users with a lower clearance, security, level. Multiple information models and visual representations may be defined for any server.

A user may access the web server 220 by executing a web browser at client 210 or client 250. Web browsers are well-known in the art, and are readily available from such corporations as Netscape Communications Corp. and Microsoft Corp. In order to access the web server 220, the user at client browser 210 activates a hyperlink having a URL (Uniform Resource Locator). Client 210 and client 250 will generally request the same URL, but will receive different views.

In the exemplary URL, the network address of the web server 220 is specified as "www.server.com" and the portion of the URL after the question mark (?) hold user specified parameters. When the hyperlink is activated, the web server 220 receives a request to initiate an application, specified by parameters embedded in the URL. In response, the web server 220 gathers information from one or more data sources.

The data or information sources can have incompatible formats, e.g. web page, relational database, spreadsheet, text file, etc. The data sources can be stored at a plurality of sites, for example, locally with respect to the web server 220, such as a hard disk at local storage 222, or externally at another site in the network, e.g. at mainframe 230. In fact, the data source can even be another, remote information web server 240.

Figure 3:
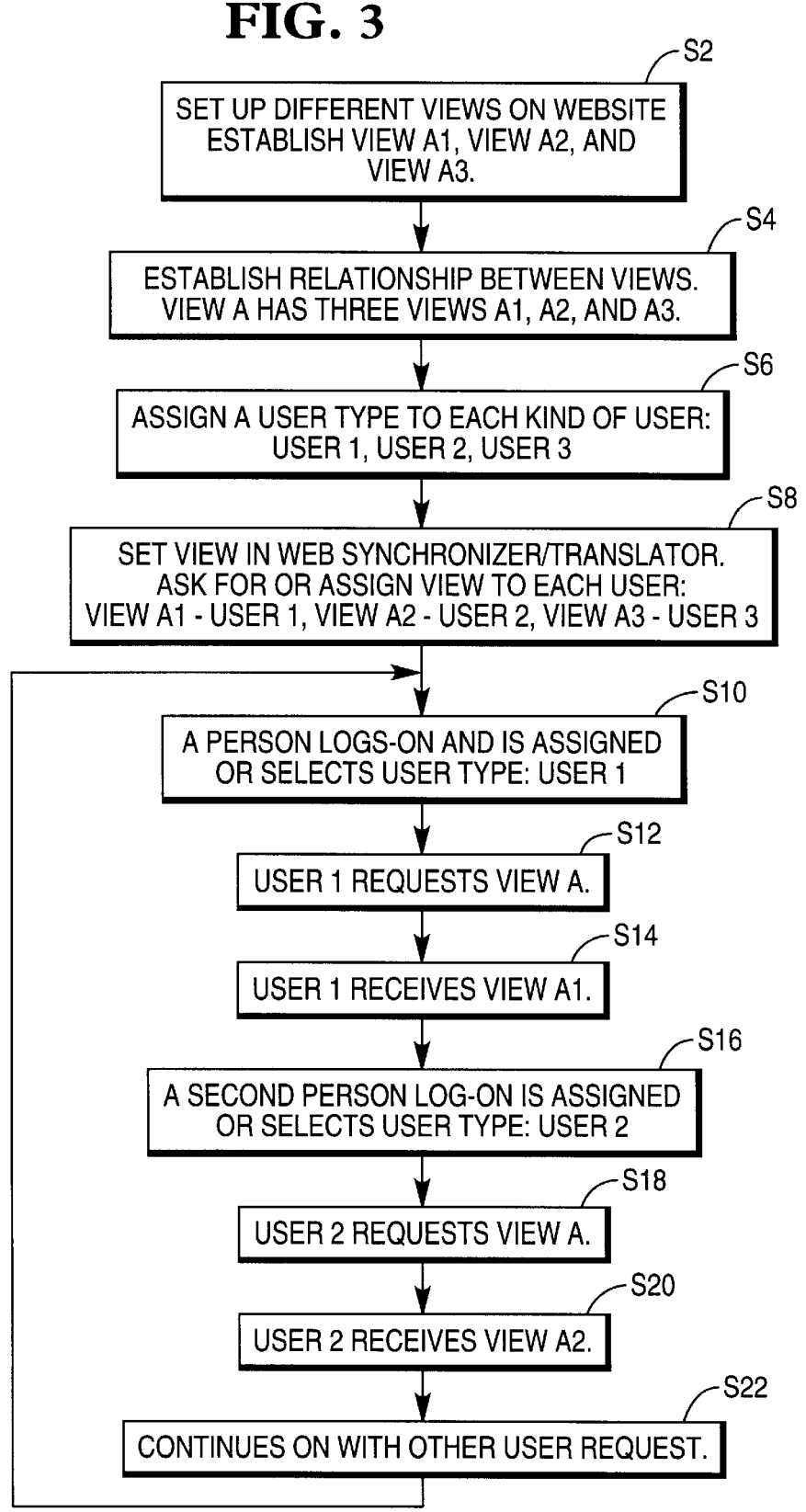
FIG. 3 depicts a flow chart for the synchronization of multiple simultaneous information presences with different views for a distributed on-line, and interactive environment in accordance with a first embodiment of the invention.

FIG. 3 depicts a flow chart for the synchronization of multiple simultaneous information presences with different views for a distributed on-line, and interactive environment in accordance with a first embodiment of the invention. As illustrated in FIG. 3, in Step S2, the different views are setup on website, for example, View A1, View A2, and View A3, View A1', View A2', or View A3' illustrated in FIG. 4. The relationship between the views is then established in Step S4. For example, View A has three views A1, A2, and A3.

In Step S6, a user type is assigned to each kind of user: User 1, User 2, User 3. The view is then set in the Web Synchronizer/Translator, e.g., the same or another computer that performs the synchronization described herein. In addition, in Step S6, each user is prompted or assigned a view. For example, View A1—User 1, View A2—User 2, and View A3—User 3. In Step S10, a person logs-on and is assigned or selects user type, for example, User 1. In Step S12, user 1 requests View A, in Step S14, user 1 receives View A1.

In Step S16, a second person logs-on and is assigned or selects a user type, for example, User 2, when, for example, an additional user logs on. In Step S18, User 2 requests, for example, View A, and in Step S20 User 2 receives, for example, View A2. The process then continues on with other user requests in Step S22, and control is then returned to Step S10 for a similar process. The specific view presented to the user is based on predetermined criteria, such as, user selectable options (before or after logon), system-defined privileges, and the like.

Figure 4:
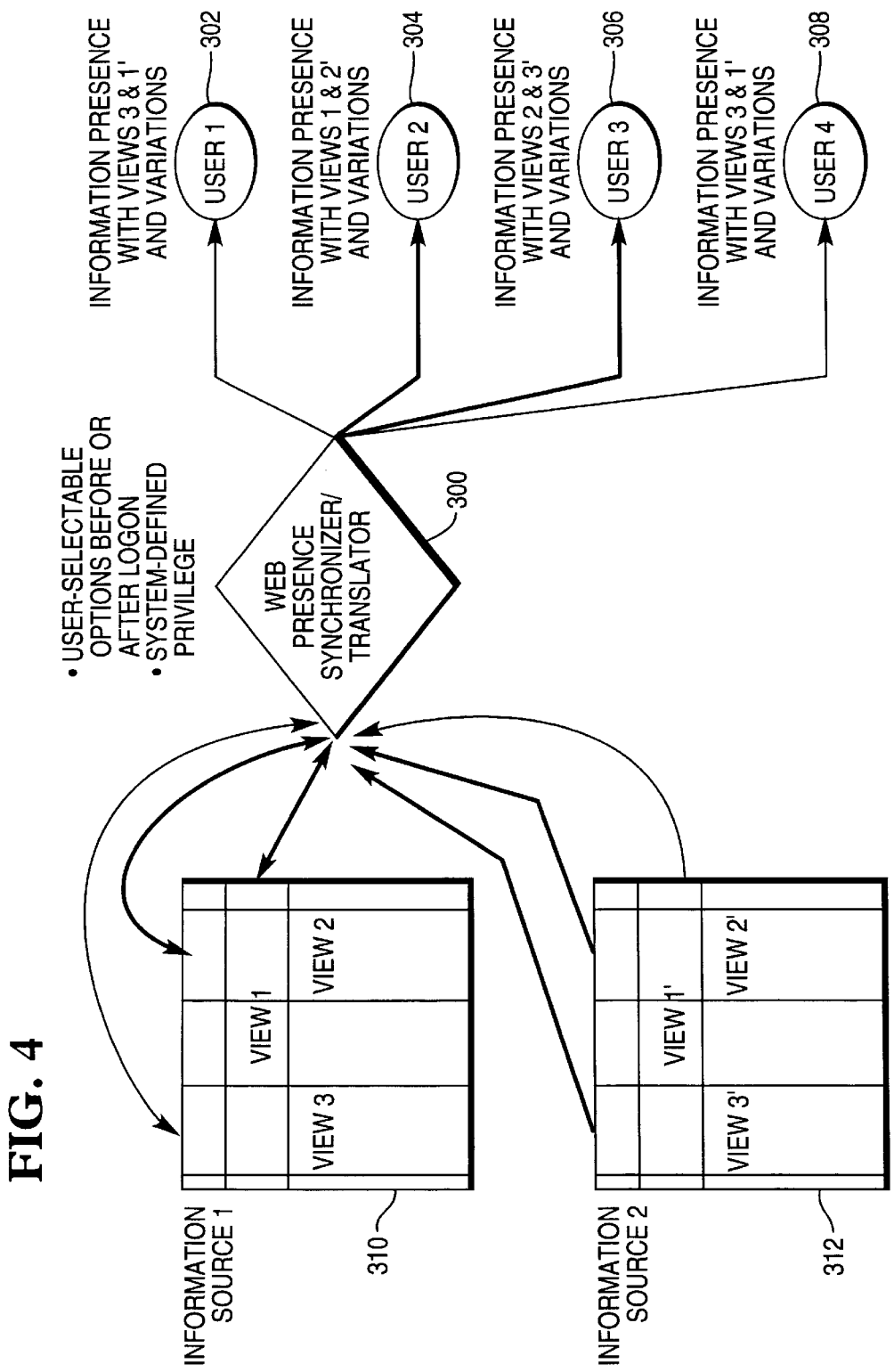
FIG. 4 depicts a distributed on-line, and interactive environment in accordance with the first embodiment of the invention.

FIG. 4 depicts a distributed on-line, and interactive environment in accordance with the first embodiment of the invention. The information sources 310, 312 can be identified as a web page, web pages, a web server or multiple web servers. The components of these information sources can be text-based, audio-based, video-based, image-based, graphic-based, and, in general, multimedia-based. A view associated with an information source can be defined as a collection of the components for that information source. An information presence is defined as a presentation of a view to the users.

Web presence synchronizer 300 provides the necessary presences for the users, e.g., users 302, 304, 306 and/or 308. The present invention allows the coordination, customization, and presentation of the Web information presences with the same view, similar views, or different views to the users depending on user selectable options and/or system defined privileges. Web presence synchronizer 300 may comprise, for example, a separate computer, the same computer, or part of one or more of the Web server computers described above.

Figure 5:
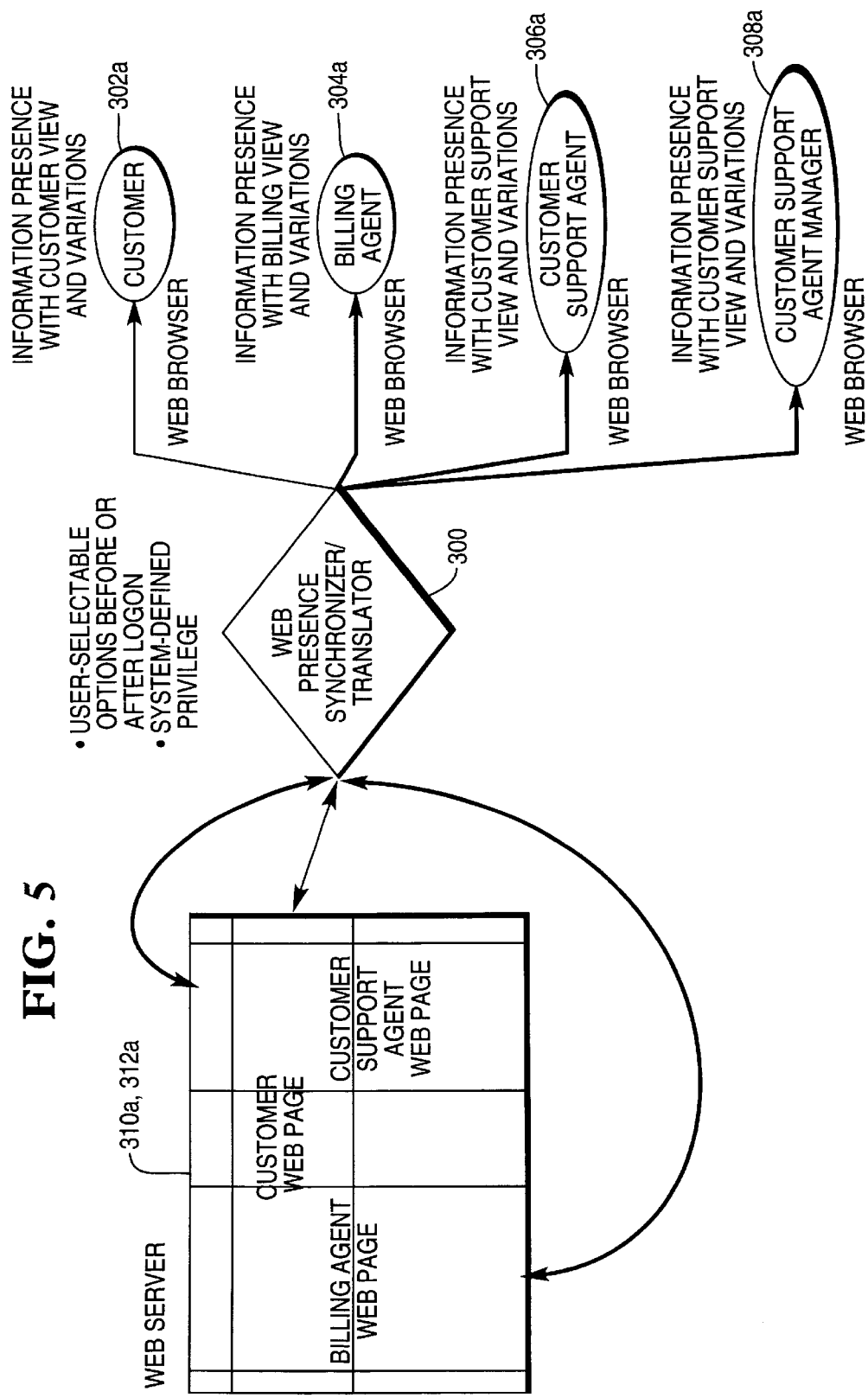
FIG. 5 depicts one example of a distributed on-line, and interactive environment illustrated in FIG. 4, in accordance with the first embodiment of the invention.

FIG. 5 depicts one example of a distributed on-line, and interactive environment illustrated in FIG. 4, in accordance with the first embodiment of the invention. In FIG. 5, the Internet/Web on-line and interactive operating environment includes, for example, multiple client browsers. The multiple client browsers may access a web server which contains specific (business operation) information such as customer support material and sales campaign schedules. The information from the sources 310a, 312a to the clients 302a, 304a, 306a, 308a is presented on the clients' browsers based on the specific instructions or predetermined criteria.

The specific instructions or predetermined criteria can be either provided by the clients for the user interest (this can be either before or after the user logon procedures) or configured by the systems administrators and/or decision makers for the policy concerns (security, access control, priorities). FIG. 5 describes the situation where the customer 302a, customer agents 306a and their manager 308a, and billing agent 304a are provided with different web pages for their corresponding needs stored in the information sources/web server 310a, 312a by the Web presence synchronizer 300. The method of the customization and presentation of the information is applicable for multiple web servers. Thus, the invention described herein in accordance with this first embodiment is the synchronization/translation of multiple web pages among customer, customer agent and his/her manager, and billing agent.

Figure 6:
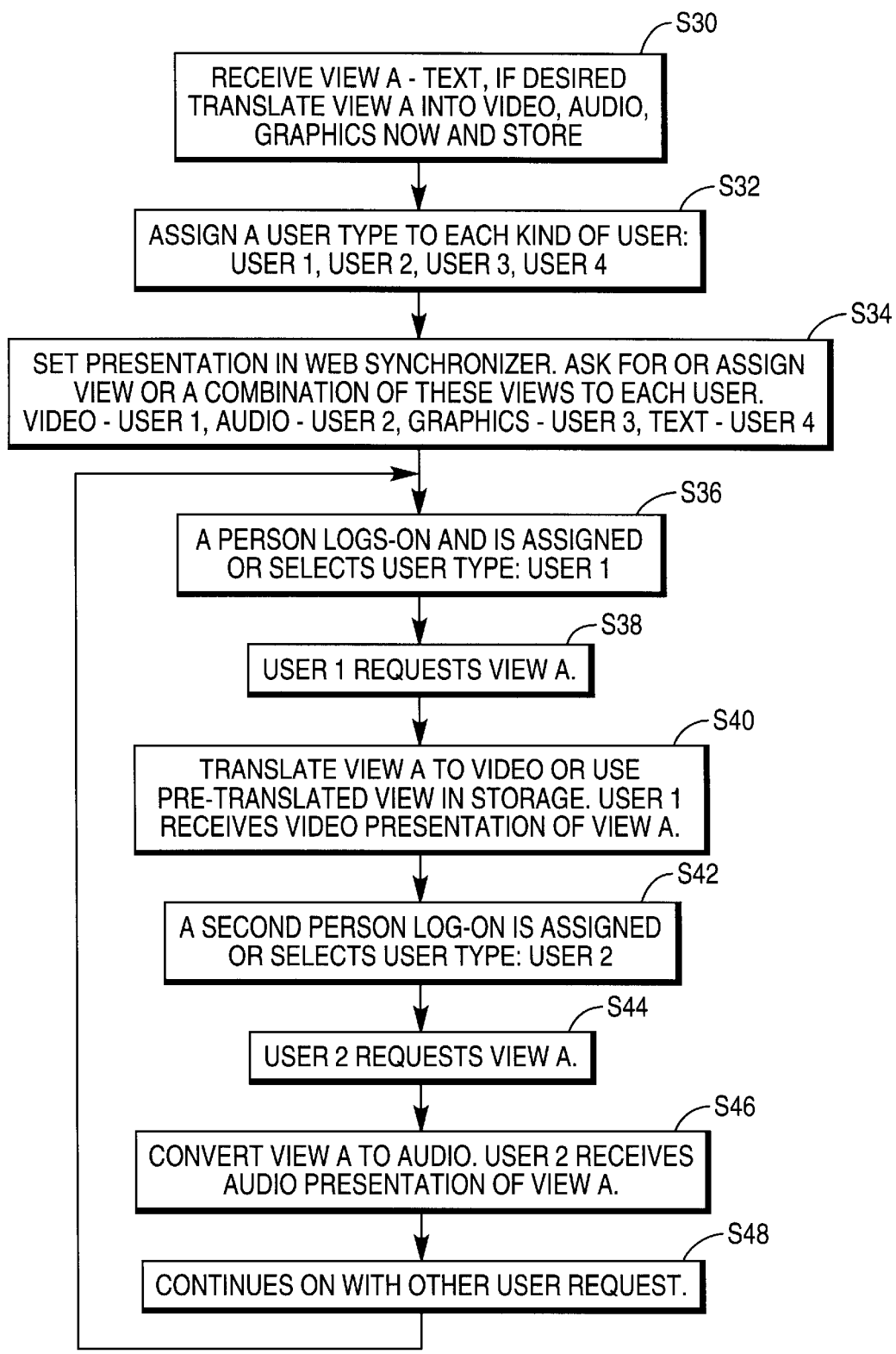
FIG. 6 depicts a flow chart for the translation of information into multiple media variations with different views for a distributed on-line, and interactive environment in accordance with a second embodiment of the invention.

FIG. 6 depicts a flow chart for the translation of information into multiple media variations with same and/or different views for a distributed on-line, and interactive environment in accordance with a second embodiment of the invention. In FIG. 6, the Web Synchronizer receives View A which is text in Step S30. View A can be received, for example, as text, and either stored as text and translated when requested, or translated immediately into views and then stored. In Step S32, each kind of user is assigned a user type, e.g., User 1, User 2, User 3, User 4. In Step S34, the presentation is set in the Web Synchronizer/Translator. Each user is prompted for or assigned a view, e.g., Video—User 1, Audio—User 2 Graphics—User 3, Text—User 4, or a combination of these views.

A Person logs-on and is assigned or selects a user type, e.g., User 1, in Step S36, and a user, for example, User 1 requests View A in Step S38. View A is converted to, for example, video and User 1 receives the video presentation of View A in Step S40. In Step S42, a second person that may log-on the Web server is assigned or selects a user type, e.g., User 2. User 2 requests View A in Step S44, and the Web synchronizer/translator converts or retrieves View A to Audio which is then received by User 2 as an Audio Presentation of View A in Step S46. The process then continues on with other user request in Step S48, and control is returned to Step S36. Note that the translation/conversion among multiple media variations can occur either on-line or off-line, at either the information source(s) or web synchronizer/translator.

FIG. 7 depicts a distributed on-line, and interactive environment in accordance with the second embodiment of the invention. In FIG. 7, the Internet/Web on-line and interactive operating environment includes, for example, multiple client browsers. The multiple client browsers may access a web server which contains specific information or predetermined criteria for presenting the view to the clients in a predetermined format. The type of information, e.g., video, text, audio, and the like, from the sources 310b, 312b to the clients 302b, 304b, 306b, 308b is presented on the clients' browsers based on the specific instructions or predetermined criteria.

The specific instructions or predetermined criteria can be either provided by the clients for the user interest (this can be either before or after the user logon procedures) or configured by the systems administrators and/or decision makers for the policy concerns (security, access control, priorities). FIG. 7 describes the situation where the customer 302b, customer agents 306b and their manager 308b, and billing agent 304b are provided with different types of information web pages, e.g., video, text, audio, and the like, for their corresponding needs stored in the information sources/web server 310b, 312b by the Web presence synchronizer/translator 300.

The method of the customization and presentation of the information is applicable for multiple web servers. Thus, the invention described herein in accordance with this second embodiment is the translation of multiple web pages in different types of information among, e.g., customer, customer agent and his/her manager, and billing agent. The presentation of a view allows multiple media variations of the presence for the same view as shown in FIG. 7. The text view of the information sources 310b, 312b can be presented to the users in text, audio, video and graphic forms.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for synchronizing multiple simultaneous information presences with different views using a computer, comprising the steps of:

(a) initializing the different views of at least one information source which may contain numeric and non-numeric information;

(b) establishing at least one relationship between the different views;

(c) assigning a user type and at least one of the different views to each user;

(d) transmitting to each user the at least one of the different views in response to at least one of a user request and the user type, based on the at least one of the different views assigned in said assigning step (c), and the relationship established in said establishing step (b).

2. A method according to claim 1, wherein said method is implemented in a distributed on-line, and interactive environment including multiple client browsers for the synchronization of the multiple simultaneous information presences with the different views.

3. A method according to claim 2, wherein the multiple client browsers are capable of accessing a web server storing information.

4. A method according to claim 2, wherein the multiple client browsers are capable of accessing a web server storing information including customer support material and sales campaign schedules.

5. A method according to claim 1, wherein said assigning step (c) assigns the user type and the at least one of the different views with automatically based predetermined criteria including at least one of system defined criteria or user defined criteria including user selectable options defined at least one of before or after log-on.

6. A method according to claim 1, wherein said method is implemented in a distributed on-line, and interactive environment for the synchronization of the multiple simultaneous information presences with the different views.

7. A method according to claim 1, wherein each of the different views comprises a plurality of sub-views.

8. A method according to claim 1, wherein said assigning step (c) assigns the user type and the at least one of the different views with automatically based predetermined criteria including at least one of system defined criteria or user defined criteria.

9. A method according to claim 1, wherein said assigning step (c) assigns the user type and the at least one of the different views with automatically based predetermined criteria including at least one of system defined criteria that includes system privileges or user defined criteria.

10. The method of claim 1, wherein different users activate the same hyperlink having the same Uniform Resource Locator (URL) but respectively receive different views.

11. The method of claim 1, wherein there are a plurality of said information sources, at least some of said plurality of sources having incompatible formats.

12. A computer program memory, storing computer instructions to synchronize multiple simultaneous information presences with different views, the computer instructions including:
(a) initializing the different views on at least one information source which may contain numeric and non-numeric information;
(b) establishing at least one relationship between the different views;
(c) assigning a user type and at least one of the different views to each user;
(d) transmitting to each user the at least one of the different views responsive to a user request, the user type, the at least one of the different views assigned in said assigning (c), and the relationship established in said establishing (b).

13. A computer program memory according to claim 12, wherein said instructions are implemented in a distributed on-line, and interactive environment including multiple client browsers for the synchronization of the multiple simultaneous information presences with the different views.

14. A computer program memory according to claim 13, wherein the multiple client browsers are capable of accessing a web server storing information.

15. A computer program memory according to claim 13, wherein the multiple client browsers are capable of accessing a web server storing information including customer support material and sales campaign schedules.

16. A computer program memory according to claim 12, wherein each of the different views comprises a plurality of sub-views.

17. A computer program memory according to claim 12, wherein said assigning (c) assigns the user type and the at least one of the different views automatically based predetermined criteria including at least one of system defined criteria or user defined criteria.

18. A computer program memory according to claim 12, wherein said assigning (c) assigns the user type and the at least one of the different views automatically based predetermined criteria including at least one of system defined criteria includes system privileges or user defined criteria.

19. A computer program memory according to claim 12, wherein said assigning (c) assigns the user type and the at least one of the different views automatically based predetermined criteria including at least one of system defined criteria or user defined criteria including user selectable options defined at least one of before or after log-on.

20. A computer program memory according to claim 12, wherein said instructions are implemented in a distributed on-line, and interactive environment for the synchronization of the multiple simultaneous information presences with the different views.

21. A computer system for synchronizing multiple simultaneous information presences with different views, comprising:
at least one storage storing the different views;
at least one user computer transmitting a user request for receiving at least one of the different views; and
at least one server, connectable to said at least one storage and said at least one user computer, for initializing the different views on at least one information source which may contain numeric and non-numeric information, establishing at least one relationship between the different views, assigning a user type and at least one of the different views to each user, and transmitting to each user the at least one of the different views responsive to the user request, the user type, the at least one of the different views, and the relationship.

22. The computer system of claim 21, wherein there are a plurality of said information sources, at least some of said plurality of sources having incompatible formats.

23. The computer system of claim 21, wherein different users activate the same hyperlink having the same Uniform Resource Locator (URL) but respectively receive different views.

* * * * *